United States Patent
Fukuda et al.

(10) Patent No.: US 8,950,955 B2
(45) Date of Patent: Feb. 10, 2015

(54) HEATING DEVICE FOR OPTICAL-FIBER REINFORCEMENT, AND OPTICAL-FIBER FUSION SPLICING DEVICE

(75) Inventors: Masakazu Fukuda, Yokohama (JP); Ryuichiro Sato, Yokohama (JP); Hisao Yui, Yokohama (JP); Hiroshi Takayanagi, Yokohama (JP)

(73) Assignee: SEI Optifrontier Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 13/995,968

(22) PCT Filed: Dec. 16, 2011

(86) PCT No.: PCT/JP2011/079244
§ 371 (c)(1),
(2), (4) Date: Jun. 20, 2013

(87) PCT Pub. No.: WO2012/086556
PCT Pub. Date: Jun. 28, 2012

(65) Prior Publication Data
US 2013/0315544 A1    Nov. 28, 2013

(30) Foreign Application Priority Data
Dec. 24, 2010  (JP) ................ 2010-288403

(51) Int. Cl.
*G02B 6/255* (2006.01)
*G02B 6/36* (2006.01)
*G02B 6/38* (2006.01)

(52) U.S. Cl.
CPC .............. *G02B 6/36* (2013.01); *G02B 6/3802* (2013.01); *G02B 6/2553* (2013.01); *G02B 6/2558* (2013.01)

USPC .......................................... 385/99

(58) Field of Classification Search
CPC ............................ G02B 6/2558; G02B 6/3802
USPC .......................................... 385/99
See application file for complete search history.

(56) References Cited

U.S. PATENT DOCUMENTS

| 7,467,899 | B2 * | 12/2008 | Akiyama ................ 385/96 |
| 7,901,147 | B1 * | 3/2011 | de Jong et al. ............ 385/95 |
| 8,254,743 | B2 * | 8/2012 | Sato ..................... 385/137 |
| 2005/0123253 | A1 | 6/2005 | Sato |
| 2009/0238523 | A1 * | 9/2009 | Honma et al. ............ 385/96 |

FOREIGN PATENT DOCUMENTS

| JP | 2006-251319 A | 9/2006 |
| JP | 2007-065026 A | 3/2007 |

* cited by examiner

Primary Examiner — Charlie Peng
(74) Attorney, Agent, or Firm — Drinker Biddle & Reath LLP

(57) ABSTRACT

An optical fiber reinforcing heating device 6A is equipped with a base part 12, while the base part 12 is provided with a sleeve accommodation groove that contains a fiber reinforcement sleeve and a heater having a U-shaped cross section, which heats the fiber reinforcement sleeve. A pair of fiber holders 19 that holds and clamps fusion-spliced optical fibers 3 are disposed on both end sides of the sleeve accommodation groove. A lid part 23 that covers the fiber accommodation groove 13 is attached openably and closably to the base part 12 through a rotary axis. A protector 24 for windbreak and heat insulation is joined to the lid part 23 through a rotary axis 25. The protector 24 is a member for preventing winds from entering the sleeve accommodation groove from a gap between a side wall of the base part 12 and the lid part 23.

13 Claims, 6 Drawing Sheets

HEATING DEVICE FOR OPTICAL-FIBER REINFORCEMENT, AND OPTICAL-FIBER FUSION SPLICING DEVICE

TECHNICAL FIELD

The present invention relates to an optical fiber reinforcing heating device for heating and shrinking a fiber reinforcement sleeve covering a fusion-splicing part of optical fibers and an optical fiber fusion-splicing device equipped with the optical fiber reinforcing heating device.

BACKGROUND ART

As an optical fiber reinforcing heating device for an optical fiber fusion-splicing device, one comprising a heating table having an accommodation unit that contains a fiber reinforcement sleeve covering a fusion-splicing part of optical fibers, which heats the fiber reinforcement sleeve; a pair of coated fiber pressing parts disposed at both ends of the heating table and grasping the optical fibers; and a lid part that covers the accommodation unit has been known, as disclosed in Patent Literature 1, for example.

CITATION LIST

Patent Literature

Patent Literature 1: Japanese Patent Application Laid-Open No. 2007-65026

SUMMARY OF INVENTION

Technical Problem

However, operations for fusion-splicing optical fibers are typically performed in outdoor environments where winds blow, whereby the following problems exist. When heating and shrinking a fiber reinforcement sleeve with an optical fiber reinforcing heating device in a fusion-splicing operation performed outdoors, a wind may enter the heating device through a gap between a heating table and a lid part, so as to dissipate heat from a heater, whereby it takes a longer time for the fiber reinforcement sleeve to shrink.

It is an object of the present invention to provide an optical fiber reinforcing heating device and an optical fiber fusion-splicing device which can mitigate influences of winds on heating and shrinking a fiber reinforcement sleeve.

Solution to Problem

The present invention relates to an optical fiber reinforcing heating device for heating and shrinking a fiber reinforcement sleeve covering a fusion-splicing part of optical fibers. The optical fiber reinforcing heating device comprises a base part having a sleeve accommodation groove that contains the fiber reinforcement sleeve; a heater that heats the fiber reinforcement sleeve contained in the sleeve accommodation groove; a pair of fiber clamping parts that clamps the optical fibers, which is arranged on both end sides of the sleeve accommodation groove; a lid part attached openably and closably to the base part, the lid part covering the sleeve accommodation groove; and a protector, joined to the lid part, which prevents winds from entering the sleeve accommodation groove in a state where the lid part is closed.

When heating and shrinking a fiber reinforcement sleeve covering a fusion-splicing part of optical fibers by using thus constructed optical fiber reinforcing heating device, the lid part is closed while the fiber reinforcement sleeve is contained in the sleeve accommodation groove of the base part, so as to cover the sleeve accommodation groove, an optical fiber is clamped to each fiber clamping part, and then the fiber reinforcement sleeve is heated by the heater. Here, even when a wind blows at the site of operation, the protector joined to the lid part inhibits the wind from entering the sleeve accommodation groove. Therefore, the optical fiber reinforcing heating device in accordance with the present invention prevents winds from dissipating heat from the heater and thus can appropriately heat and shrink the fiber reinforcement sleeve.

In the optical fiber reinforcing heating device, the protector may be joined to the lid part such as to descend along a side face of the base part when the lid part is opened. In this case, the protector does not project sideways from the base part in a state where the lid part is open, whereby no large operation space is necessary. In this case, the base part may have a guide part that guides the protector such that the protector descends along the side face of the base part when the lid part is opened, the guide part including a depression adapted to engage the protector.

In the optical fiber reinforcing heating device, the heater may have a U-shaped cross section and be arranged such as to extend along bottom and side faces of the sleeve accommodation groove. Using the heater having such a U-shaped cross section can efficiently heat the fiber reinforcement sleeve as a whole. The protector may have an L-shaped cross section. In this case, even when the heat of the heater is transmitted to a side wall of the base part, so as to make it hotter, the protector having the L-shaped cross section secures a sufficient airspace between the side wall and the protector without being separated from the side wall and thus can make it harder for the heat to transmit from the side wall to the protector. This allows the protector to protect operators against the heat of the side wall without increasing the size of the optical fiber reinforcing heating device.

The optical fiber fusion-splicing device of the present invention comprises a fusion splicer that fusion-splices an optical fiber and any of the optical fiber reinforcing heating devices mentioned above.

By providing the above-mentioned optical fiber reinforcing heating device, thus constructed optical fiber fusion-splicing device prevents winds from dissipating heat from the heater as mentioned above and thus can appropriately heat and shrink the fiber reinforcement sleeve.

Advantageous Effects of Invention

The present invention can mitigate influences of winds on heating and shrinking the fiber reinforcement sleeve. This makes it possible to shrink the fiber reinforcement sleeve without taking a long time.

DESCRIPTION OF EMBODIMENTS

In the following, embodiments of the optical fiber reinforcing heating device and optical fiber fusion-splicing device in accordance with the present invention will be explained in detail with reference to the drawings.

Figure 1:
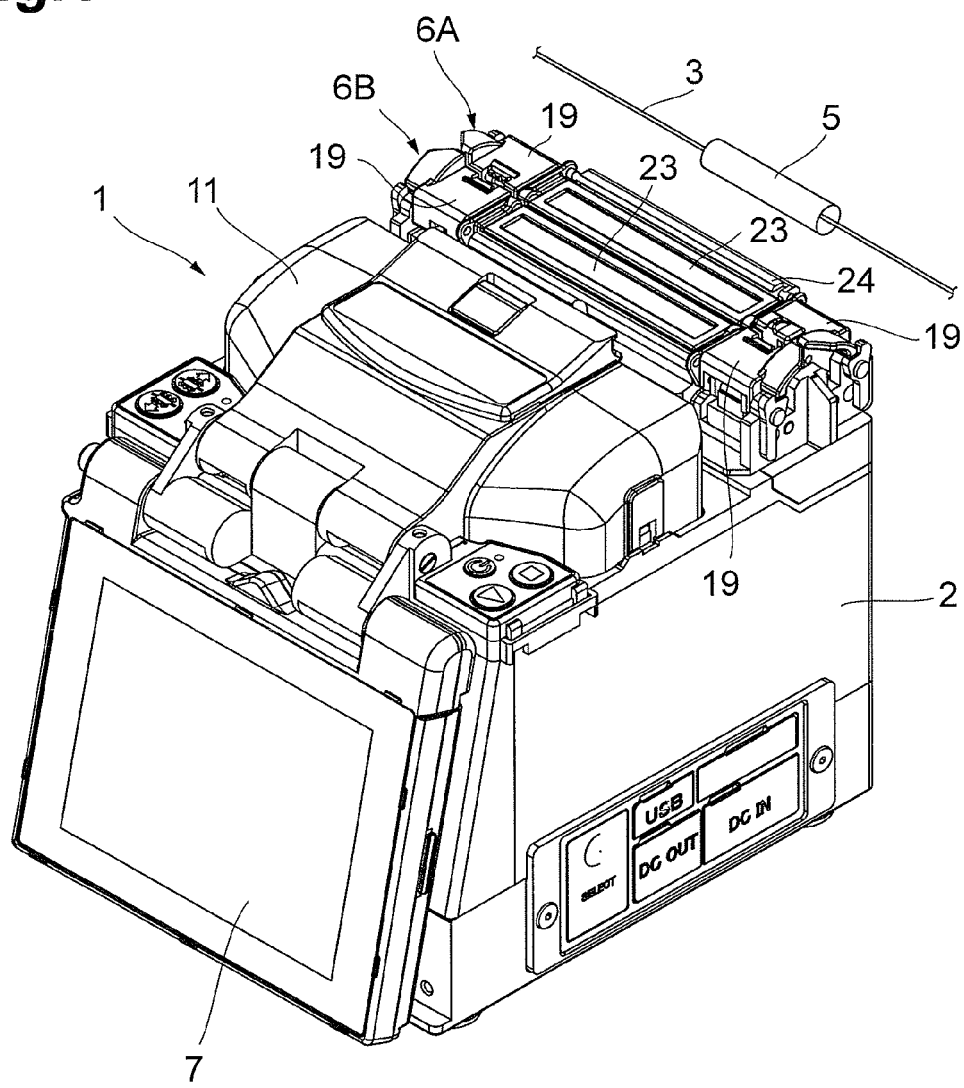
FIG. 1 is a perspective view illustrating the exterior of one embodiment of the optical fiber fusion-splicing device in accordance with the present invention.

FIG. 1 is a perspective view illustrating the exterior of one embodiment of the optical fiber fusion-splicing device in accordance with the present invention. In this drawing, the optical fiber fusion-splicing device 1 of this embodiment is equipped with a box-shaped housing 2. The upper part of the housing 2 is provided with a fusion splicer 4 (see FIG. 2) that fuses and splices respective leading ends of two optical fibers 3 to each other and optical fiber reinforcing heating devices 6A, 6B that heats and shrinks a fiber reinforcement sleeve 5 covering a fusion-splicing part of the optical fibers 3. The optical fiber fusion-splicing device 1 is equipped with a monitor 7 which displays states of fusion-splicing of the optical fibers 3 captured by a camera (not depicted) arranged within the housing 2.

Figure 2:
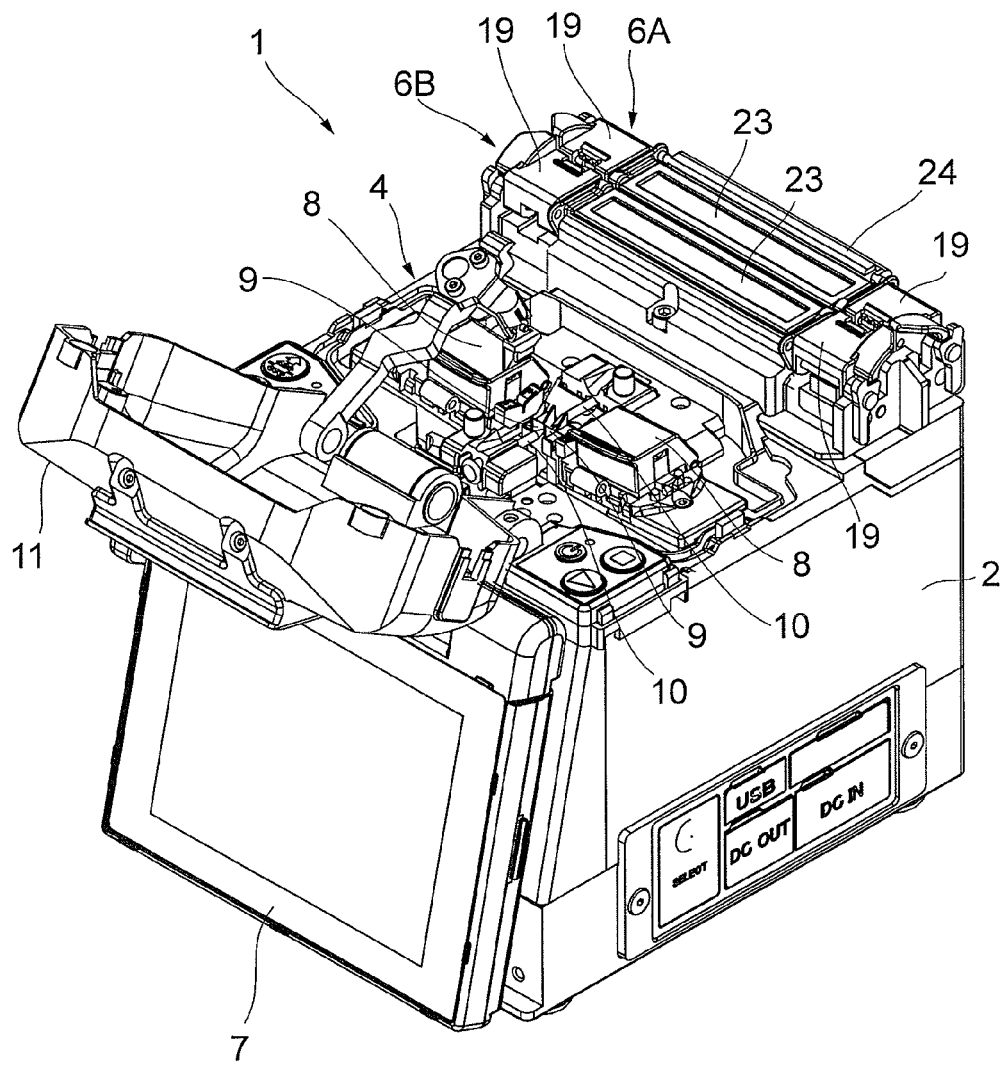
FIG. 2 is a perspective view illustrating the exterior of the optical fiber fusion-splicing device in a state where a windproof cover depicted in FIG. 1 is open.

As illustrated in FIG. 2, the fusion splicer 4 has a pair of fiber holders 8 which hold the two optical fibers 3, respectively; a pair of fiber positioning parts 9, arranged between the fiber holders 8, which positions the respective leading end parts of the optical fibers 3; and a pair of discharge electrodes 10, arranged between the fiber positioning parts 9, which fuses the leading ends of the optical fibers 3 to each other by arc discharge. Thus constructed fusion splicer 4 is covered with a windproof cover 11 so as to be openable and closable.

The optical fiber reinforcing heating devices 6A, 6B are arranged in a row adjacent to the fusion splicer 4. The optical fiber reinforcing heating device 6A farther from the fusion splicer 4 has a base part 12 as illustrated in FIGS. 3 to 6. The base part 12 constitutes a housing of the optical fiber reinforcing heating device 6A and is formed so as to extend not only over the bottom face part of the optical fiber reinforcing heating device 6A but also to side face parts and the like thereof. The base part 12 may be constructed by a member different from the housing 2 or integrated with the housing 2. The base part 12 is formed with a sleeve accommodation groove 13 that contains a fiber reinforcement sleeve 5.

The fiber reinforcement sleeve 5 is constituted by a heat-shrinkable tube 14 and a tension member 15 and an inner tube 16 which are arranged within the heat-shrinkable tube 14. The tension member 15 is made of a metal, glass, or the like. The inner tube 16 is formed from a hot-melt resin. As the heat-shrinkable tube 14 and inner tube 16, several kinds of those having different sizes and forms are used.

The sleeve accommodation groove 13 is formed by an aluminum sheet 17 having a U-shaped cross section. A film heater 18 having a U-shaped cross section for heating the fiber reinforcement sleeve 5 contained in the sleeve accommodation groove 13 is attached to the rear face (outer surface) of the aluminum sheet 17. That is, the heater 18 extends along the bottom face and side faces of the sleeve accommodation groove 13. Using thus constructed heater 18 having a U-shaped cross section can effectively heat the fiber reinforcement sleeve 5.

A pair of fiber holders 19 that holds and clamps the optical fibers 3 fusion-spliced by the fusion splicer 4 are disposed on both end sides of the sleeve accommodation groove 13. Each fiber holder 19 is constituted by a fiber accommodation part 20 that contains the optical fiber 3 and a lid part 22, attached openably and closably to the fiber accommodation part 20 through a rotary axis 21, which presses the optical fiber 3 against the fiber accommodation part 20.

A lid part 23 that covers the sleeve accommodation groove 13 is attached openably and closably to the base part 12 through a rotary axis 21P. The lid part 23 is formed from a transparent resin or the like so that how the fiber reinforcement sleeve 5 shrinks can be seen visually, for example.

Figure 3:
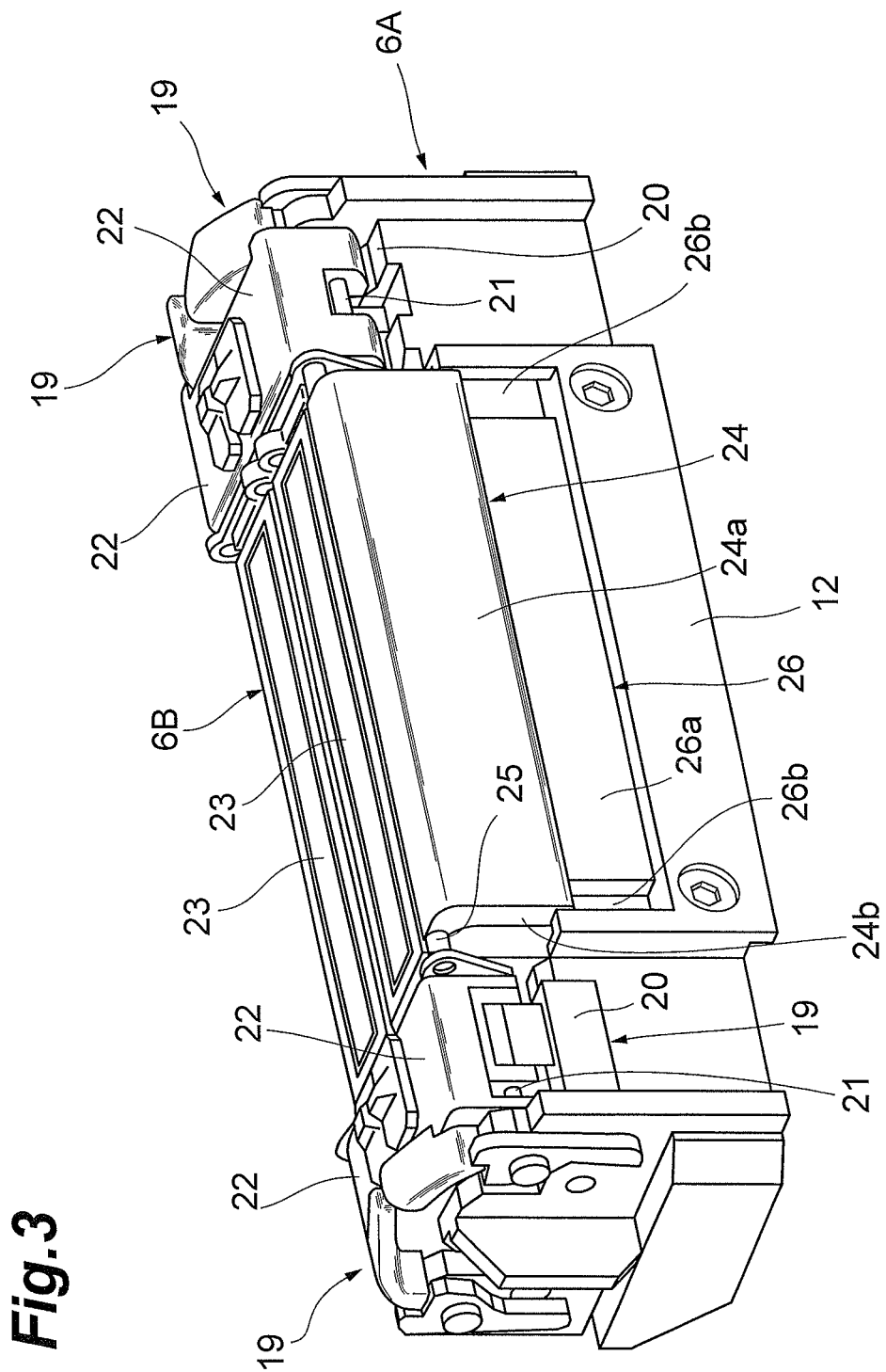
FIG. 3 is a perspective view illustrating the exterior of an optical fiber reinforcing heating device depicted in FIG. 1.
Figure 4:
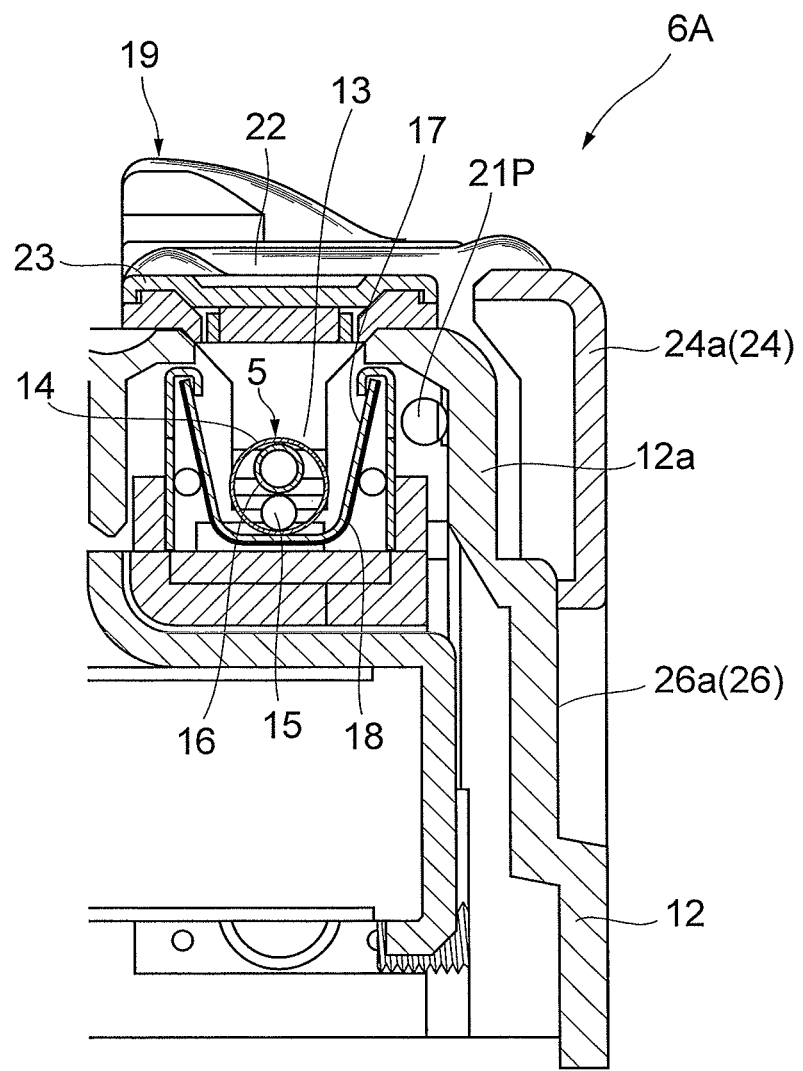
FIG. 4 is a sectional view of the optical fiber reinforcing heating device illustrated in FIG. 3.

A protector 24 for windbreak and heat insulation is joined to the lid part 23 through a rotary axis 25. The protector 24, which is located on the outside of the housing 2 (the side opposite from the fusion splicer 4), is a member that prevents winds from entering the sleeve accommodation groove 13 through a gap between a side wall 12a of the base part 12 and the lid part 23 in the state where the lid part 23 is closed as illustrated in FIGS. 3 and 4.

The protector 24 has a board-like structure constructed by a main part 24a having an L-shaped cross section and a pair of sheet parts 24b disposed on both end sides of the main part 24a. A side face on the outside of the base part 12 is formed with a depressed guide 26 for guiding the protector 24. The depressed guide 26 is constituted by a depression 26a adapted to engage the main part 24a and a pair of depressions 26b formed deeper than the former depression 26a on both end sides of the depression 26a and adapted to engage the respective sheet parts 24b.

Figure 5:
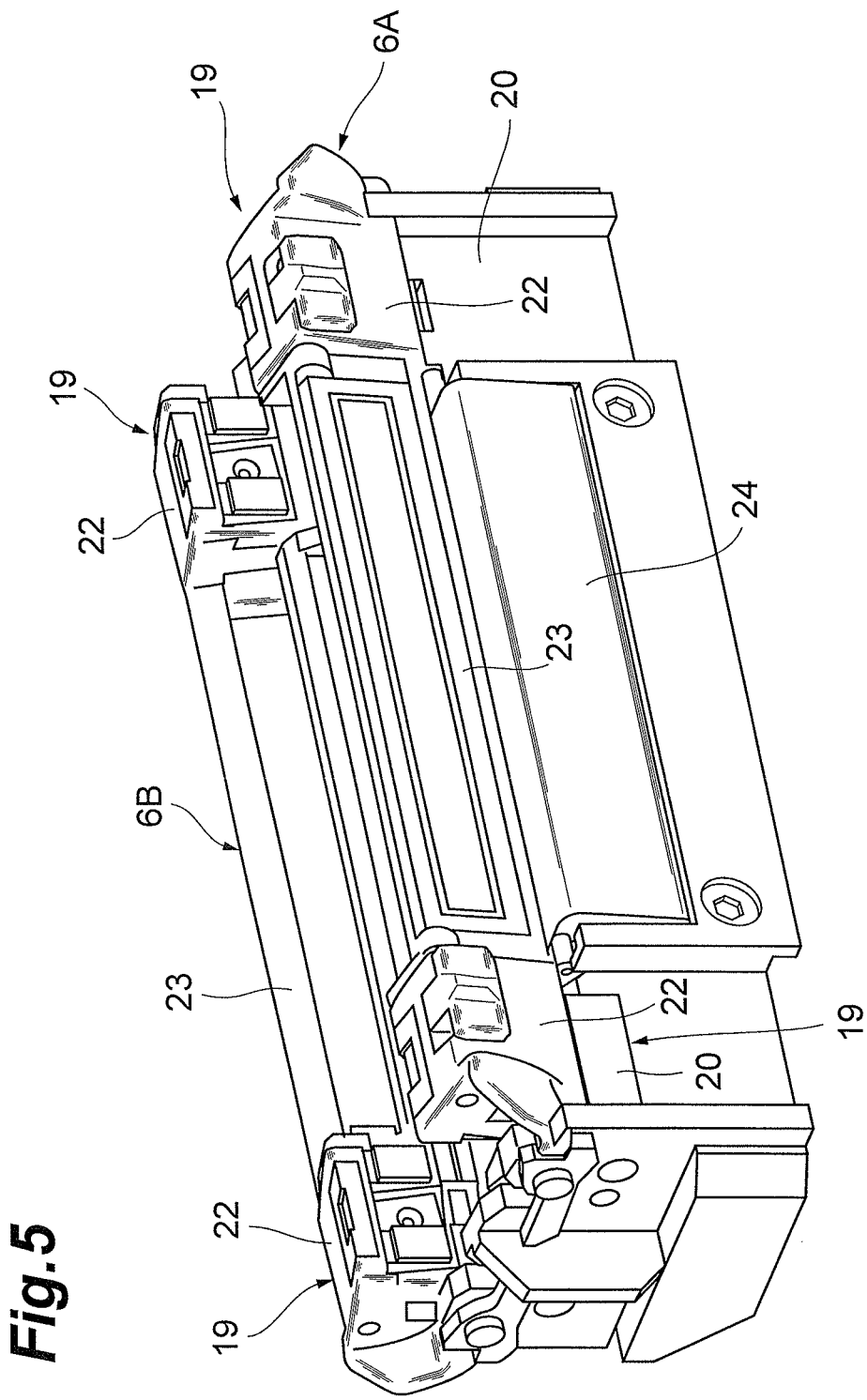
FIG. 5 is a perspective view illustrating the exterior of the optical fiber reinforcing heating device in a state where a lid part depicted in FIG. 3 is open.
Figure 6:
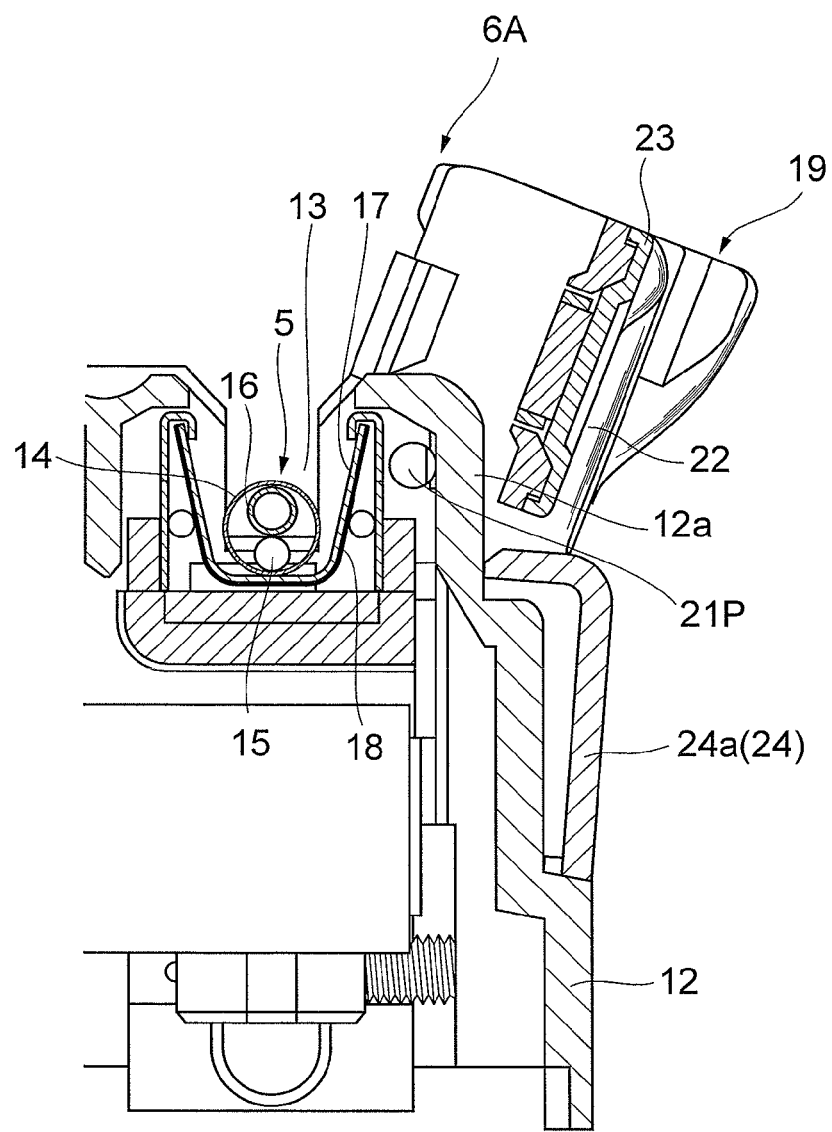
FIG. 6 is a sectional view of the optical fiber reinforcing heating device illustrated in FIG. 5.

When the lid part 23 is opened, the protector 24 descends along the depressed guide 26 while rotating with respect to the lid part 23 as illustrated in FIGS. 5 and 6. Therefore, the lid part 23 does not project sideways from the base part 12 even when opened, so that the optical fiber reinforcing heating device 6A is inhibited from increasing its size, whereby no large operation space is necessary.

The optical fiber reinforcing heating device 6B closer to the fusion splicer 4 has substantially the same structure as with the optical fiber reinforcing heating device 6A except for the lack of the protector 24. Since the windproof cover 11 blocks winds when closed, the optical fiber reinforcing heating device 6B does not require the protector 24 in particular.

A fusion-splicing operation using thus constructed optical fiber fusion-splicing device 1 is performed at an outdoor site. First, the fusion splicer 4 fusion-splices the two optical fibers 3 to each other. Specifically, one optical fiber 3 is passed through the fiber reinforcement sleeve 5. Subsequently, while the windproof cover 11 is open, the leading ends of the optical fibers 3 are butted against each other at the fiber positioning parts 9, and the fiber holder parts 8 hold and clamp the respective optical fibers 3. Then, the windproof cover 11 is closed, and the discharge electrodes 10 fuse the leading ends of the optical fibers 3 to each other by discharge.

Next, thus fusion-spliced optical fibers 3 are taken out from the fusion splicer 4, and the optical fiber reinforcing heating devices 6A, 6B heat and shrink the fiber reinforcement sleeve 5, thereby reinforcing the fusion-spliced part of the optical fibers 3. At this time, the optical fiber reinforcing heating devices 6A, 6B are used in this order.

Specifically as illustrated in FIGS. 5 and 6, while the lid parts 22, 23 are open, the fiber reinforcement sleeve 5 is moved to the fusion-splicing part of the optical fibers 3, so as to be contained in the sleeve accommodation groove 13 of the base part 12. Subsequently, as illustrated in FIGS. 3 and 4, the lid part 23 is closed, so as to cover and block the sleeve accommodation groove 13, and the lid parts 22 are closed, so as to press and clamp the optical fibers 3 to the fiber accommodation parts 20. In this state, the heater 18 is energized, so as to heat and shrink the fiber reinforcement sleeve 5.

Here, the protector 24 provided with the optical fiber reinforcing heating device 6A blocks winds from entering the sleeve accommodation groove 13 through a gap between the side wall 12a of the base part 12 and the lid part 23. This prevents winds from dissipating heat from the heater 18, whereby the fiber reinforcement sleeve 5 does not become harder to shrink.

Heating the fiber reinforcement sleeve 5 with the heater 18 having a U-shaped cross section makes the side wall 12a of the base part 12 easier to become hotter. Since the protector 24 has an L-shaped cross section, however, a sufficient airspace (air layer) is secured between the side wall 12a and the protector 24, which makes it harder for the heat to transmit from the side wall 12a to the protector 24, whereby operators can be protected against the heat of the heater 18.

As for the optical fiber reinforcing heating device 6B closer to the fusion splicer 4, thickening the side wall 12a of the base part 12 while providing the side wall 12a with an air layer makes it harder for the heat to transmit from the heater 18 to the side wall 12a, for example. In this case, forming the windproof cover 11 with a cutout corresponding to the increased thickness of the side wall 12a can keep the housing 2 from becoming larger in size.

As in the foregoing, the protector 24 inhibits winds from entering the optical fiber reinforcing heating device 6A, whereby the winds are prevented from dissipating heat from the heater 18 in this embodiment. This can heat and shrink the fiber reinforcement sleeve 5 without taking a long time.

Since the protector 24 effectively blocks the heat of the heater 18, the safety of operators can be secured without increasing the size of the optical fiber reinforcing heating device 6A in particular.

The present invention is not limited to the above-mentioned embodiment. For example, while the above-mentioned embodiment uses the heater 18 having a U-shaped cross section, the structure of the heater 18 is not limited thereto in particular; a sheet-shaped heater may be disposed on the bottom part of the sleeve accommodation groove 13, for instance. This suppresses the heating of the side wall 12a of the base part 12, whereby the protector 24 is not restricted to the one having the L-shaped cross section in particular.

While the optical fiber fusion-splicing device 1 of the above-mentioned embodiment is provided with one each of the optical fiber reinforcing heating devices 6A, 6B, this is not restrictive; only one optical fiber reinforcing heating device 6A or one optical fiber reinforcing heating device 6A and a plurality of optical fiber reinforcing heating devices 6B may be provided, for example.

While the above-mentioned embodiment fusion-splices single-core optical fibers 3 to each other, the present invention is also applicable to one which fusion-splices multicore optical fibers collectively to each other.

REFERENCE SIGNS LIST

1 . . . Optical fiber fusion-splicing device; 3 . . . Optical fiber; 4 . . . Fusion splicer; 5 . . . Fiber reinforcement sleeve; 6A . . . Optical fiber reinforcing heating device; 12 . . . Base part; 13 . . . Sleeve accommodation groove; 18 . . . Heater; 19 . . . Fiber holder (Fiber clamping part); 23 . . . Lid part; 24 . . . Protector; 24a . . . Main part

The invention claimed is:

1. An optical fiber reinforcing heating device for heating and shrinking a fiber reinforcement sleeve covering a fusion-splicing part of optical fibers, the optical fiber reinforcing heating device comprising:
   a base part having a sleeve accommodation groove that contains the fiber reinforcement sleeve;
   a heater that heats the fiber reinforcement sleeve contained in the sleeve accommodation groove;
   a pair of fiber clamping parts that clamp the optical fibers, which are arranged on both end sides of the sleeve accommodation groove;
   a lid part attached openably and closably to the base part, the lid part covering the sleeve accommodation groove; and
   a protector, joined to the lid part, which prevents winds from entering the sleeve accommodation groove in a state where the lid part is closed
   wherein the protector is joined to the lid part such as to descend along a side face of the base part when the lid part is opened.

2. The optical fiber reinforcing heating device according to claim 1, wherein the base part has a guide part that guides the protector such that the protector descends along the side face of the base part when the lid part is opened; and
   wherein the guide part includes a depression adapted to engage the protector.

3. The optical fiber reinforcing heating device according to claim 1, wherein the heater has a U-shaped cross section and is arranged such as to extend along bottom and side faces of the sleeve accommodation groove.

4. An optical fiber fusion-splicing device comprising:
   a fusion splicer that fusion-splices optical fibers; and
   the optical fiber reinforcing heating device according to claim 1.

5. The optical fiber reinforcing heating device according to claim 1, wherein the protector is formed so as to be spaced from a side face of the base part.

6. The optical fiber reinforcing heating device according to claim 1, wherein the protector has an L-shaped cross section.

7. An optical fiber reinforcing heating device for heating and shrinking a fiber reinforcement sleeve covering a fusion-splicing part of optical fibers, the optical fiber reinforcing heating device comprising:
   a base part having a sleeve accommodation groove that contains the fiber reinforcement sleeve;
   a heater that heats the fiber reinforcement sleeve contained in the sleeve accommodation groove;
   a pair of fiber clamping parts that clamp the optical fibers, which are arranged on both end sides of the sleeve accommodation groove;
   a lid part attached openably and closable to the base part, the lid part covering the sleeve accommodation groove; and
   a protector, joined to the lid part, which prevents winds from entering the sleeve accommodation groove in a state where the lid part is closed
   wherein the protector is formed so as to be spaced from a side face of the base part.

8. The optical fiber reinforcing heating device according to claim 7, wherein the heater has a U-shaped cross section and is arranged such as to extend along bottom and side faces of the sleeve accommodation groove.

9. The optical fiber reinforcing heating device according to claim 7, wherein the protector has an L-shaped cross section.

10. An optical fiber fusion-splicing device comprising:
    a fusion splicer that fusion-splices optical fibers; and the optical fiber reinforcing heating device according to claim 7.

11. An optical fiber reinforcing heating device for heating and shrinking a fiber reinforcement sleeve covering a fusion-splicing part of optical fibers, the optical fiber reinforcing heating device comprising:
- a base part having a sleeve accommodation groove that contains the fiber reinforcement sleeve;
- a heater that heats the fiber reinforcement sleeve contained in the sleeve accommodation groove;
- a pair of fiber clamping parts that clamp the optical fibers, which are arranged on both end sides of the sleeve accommodation groove;
- a lid part attached openably and closably to the base part, the lid part covering the sleeve accommodation groove;
- a protector, joined to the lid part, which prevents winds from entering the sleeve accommodation groove in a state where the lid part is closed wherein the protector has an L-shaped cross section.

12. The optical fiber reinforcing heating device according to claim 11, wherein the heater has a U-shaped cross section and is arranged such as to extend along bottom and side faces of the sleeve accommodation groove.

13. An optical fiber fusion-splicing device comprising:
- a fusion splicer that fusion-splices optical fibers; and
- the optical fiber reinforcing heating device according to claim 11.

* * * * *